United States Patent [19]

Bertrand

[11] Patent Number: 5,552,989
[45] Date of Patent: Sep. 3, 1996

[54] PORTABLE DIGITAL MAP READER

[76] Inventor: Georges Bertrand, 35, rue du Bois-des-Joncs-Marins, 94120 Fontenay-sous-Bois, France

[21] Appl. No.: 211,924
[22] PCT Filed: Oct. 27, 1992
[86] PCT No.: PCT/FR92/01002
    § 371 Date: Apr. 28, 1994
    § 102(e) Date: Apr. 28, 1994
[87] PCT Pub. No.: WO93/09401
    PCT Pub. Date: May 13, 1993

[30] Foreign Application Priority Data

Oct. 30, 1991 [FR] France ................... 91 13345

[51] Int. Cl.⁶ ............................. G06F 165/00
[52] U.S. Cl. .................. 364/443; 364/449; 340/990; 340/995
[58] Field of Search ................... 364/443, 444, 364/449; 73/178 R; 340/988, 990, 995

[56] References Cited

U.S. PATENT DOCUMENTS

| | | | |
|---|---|---|---|
| 4,312,577 | 1/1982 | Fitzgerald | 353/12 |
| 4,527,155 | 7/1985 | Yamaki et al. | 340/990 |
| 4,570,227 | 2/1986 | Tachi et al. | 364/444 |
| 4,608,656 | 8/1986 | Tanaka et al. | 364/449 |
| 4,628,456 | 12/1986 | Hatano et al. | 364/449 |
| 4,694,583 | 9/1987 | Blaney | 33/361 |
| 4,812,980 | 3/1989 | Yamada et al. | 364/449 |
| 4,951,211 | 8/1990 | De Villeroche | 364/444 |
| 5,021,961 | 6/1991 | Ross et al. | 364/444 |
| 5,297,051 | 3/1994 | Arakawa et al. | 364/443 |
| 5,353,034 | 10/1994 | Sato et al. | 340/988 |

FOREIGN PATENT DOCUMENTS

| | | |
|---|---|---|
| 0355232 | 2/1990 | European Pat. Off. . |
| 2634707 | 2/1990 | France . |
| 3933458 | 4/1991 | Germany . |
| 55-112508 | 8/1980 | Japan . |

OTHER PUBLICATIONS

Patent Abstracts of Japan, vol. 4, No. 163 (P–36)(645), 13 Nov. 1980.

*Primary Examiner*—Gary Chin
*Attorney, Agent, or Firm*—Ladas & Parry

[57] ABSTRACT

The invention relates to an appliance for reading digital geographical maps, in particular topographical or road maps, recorded on magnetic or optical media, the appliance comprising in conventional manner a central processor unit (19), means (4, 5) for reading magnetic or optical media, at least one display screen (8, 9), control means (7, 10), and electrical power supply means. It includes a compass (45) adapted to measure the angle between the orientation of the appliance and magnetic north, and to send corresponding information to the central unit (19), said central unit responding to said information by issuing a corresponding order to the screen display process to cause the displayed image to be oriented as a function of said information. The appliance is designed to replace a conventional paper map, together with guidebooks, diaries, and directories.

8 Claims, 7 Drawing Sheets

PORTABLE DIGITAL MAP READER

BACKGROUND OF THE INVENTION

The present invention relates to a lightweight and self-contained appliance enabling digital maps to be read and enabling local information to be associated therewith, in particular to replace paper guidebooks, and paper geographical maps, topographical maps or road maps.

Paper maps suffer from numerous drawbacks and limitations, and in particular:

they are unhandy (map size does not make for ease of manipulation);

they are fragile (because they are handled so much);

they are discontinuous (several maps are necessary to cover a given territory);

they are of limited information capacity (a map with too much detail is unreadable) thus making it impossible, in particular, to gain access to additional local information (a map needs to be used in association with a guidebook);

they cannot be updated (an out-of-date paper map must be discarded); and scale is fixed (to change scale it is necessary to change map).

Systems for navigation and for providing assistance in car driving are known that calculate the position of a vehicle relative to a digital road map background. However, such systems are typically complex, e.g. relying on special road infrastructure, or they are expensive, and not self-contained, thus corresponding to a limited part of the use to which a geographical map or town plan on paper can be put.

SUMMARY OF THE INVENTION

In contrast, the present invention seeks to provide self-contained apparatus that is easy to use and cheap, and that enables digital road maps or geographical maps to be consulted in any location, such consultation being facilitated by the orientation of the displayed map being constant, as a function of user displacement.

Another object of the invention is to enable all kinds of display processing to be performed: updating, printing, storage, and topographical calculation, all of which are at present impossible using a map on paper.

These objects are achieved by an appliance for reading digital geographical maps, in particular topographical or road maps, recorded on magnetic or optical media, the appliance comprising in conventional manner a central processor unit, means for reading magnetic or optical media, at least one display screen, control means, and electrical power supply means, the appliance being characterized in that it further includes a compass adapted to measure the angle between the orientation of the appliance and magnetic north, and to send corresponding information to the central unit, said central unit responding to said information by issuing a corresponding order to the screen display process to cause the displayed image to be oriented as a function of said information.

This orientation of the map thus enables users to position themselves automatically in three dimensions and observe the topography of the places in front of them without any risk of confusion on the display screen when the apparatus is held in the hand in front of them.

Advantageously, it includes two display screens suitable respectively for displaying a portion of a digital map, and for any other information such as a map, text, a picture, or an icon.

It is thus possible to associate certain places displayed on the first screen with multimedia information (sound, text, images) visible on the second screen and of use to a walker, a tourist (display and description of a view, of sites, of monuments, providing a list of hotels, of restaurants, of facilities, etc. . . . ), to a professional (addresses, resources, etc. . . . ), or to a visitor (exhibitions, museums, etc. . . . ).

Advantageously, the device of the invention is powered in self-contained manner by batteries that are rechargeable or otherwise, and it is portable. On-board a vehicle, the power supply may be obtained directly from the vehicle battery.

Preferably, it includes means enabling local multimedia information to be recorded and played back, together with means enabling a planned or a performed itinerary to be recorded and displayed, in particular with its characteristic times, distances, and changes in altitude.

In a professional version, it may include means for displaying and recording information of any kind on the described map and in association with a directory or a diary.

BRIEF DESCRIPTION OF THE DRAWINGS

Other characteristics and advantages of the present invention appear more clearly on reading the following description which is made with reference to the accompanying drawings, in which.

DESCRIPTION OF THE PREFERRED EMBODIMENT(S)

Figure 1:
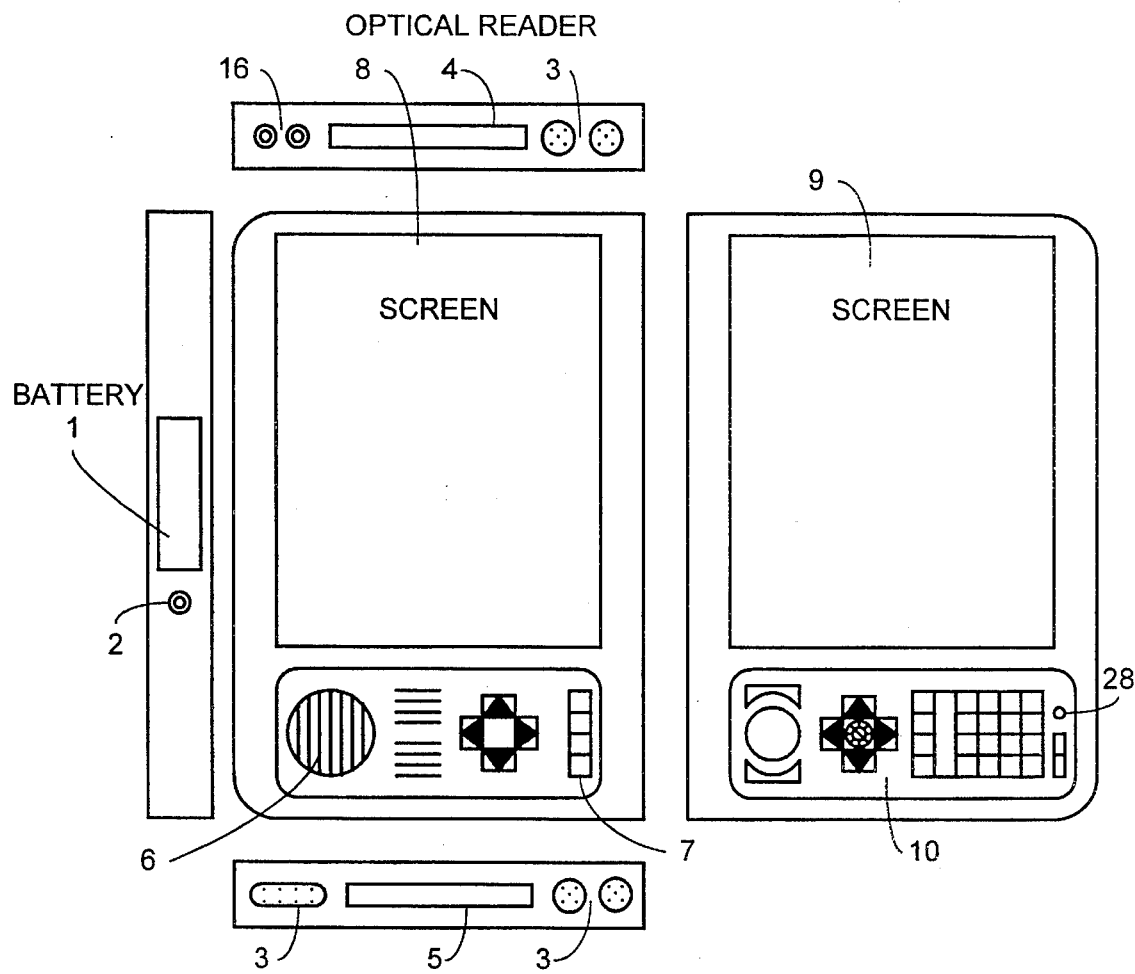
FIG. 1 shows an embodiment of a two-screen reader for digital road or topographical or geographical maps.

FIG. 1 shows a two-screen digital map reader of the invention made up of two portions each having its own screen, which portions may be separated and assembled together by snap-fastening. The lefthand portion contains a battery 1, an electrical power supply circuit 2, a plurality of input/output connectors and sockets, in particular for an audio headset 16, an optical reader 4, a magnetic recorder and reader 5, a loudspeaker 6, a control keypad 7, and a flat screen 8. The righthand portion includes a screen 9 that is advantageously touch-sensitive, and a set of controls 10 provided, in particular, with a microphone 28. In the closed position, the righthand portion overlies the lefthand portion.

Figure 2:
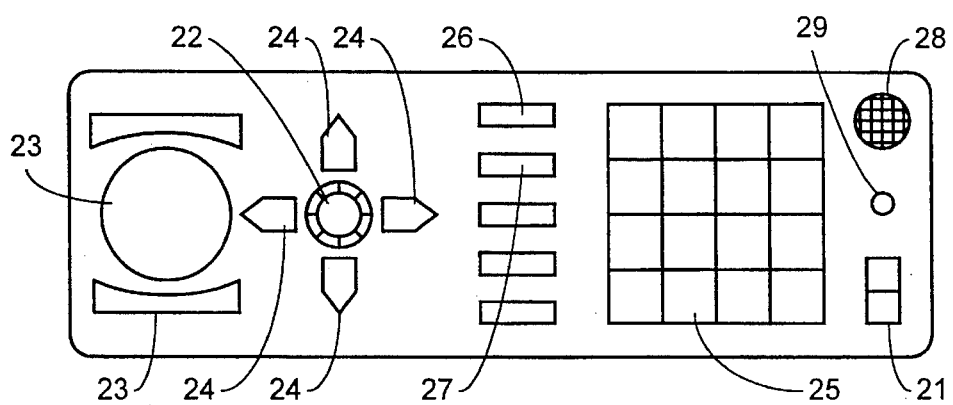
FIG. 2 shows an embodiment of the controls for the FIG. 1 reader.

FIG. 2 shows the set of controls of FIG. 1 in greater detail.

It comprises:

- an on/off switch 21 with an associated indicator lamp 29;
- a zoom control (change of scale) by means of a knob, keys, a cursor, or any other device 22;
- a cursor-moving ball (a trackball) or any other device 23 enabling a cursor to be positioned and actuated on the screen;
- keys 24 for screen scrolling, these keys may be replaced by a joystick or by any other appropriate device;
- a digital keypad 25 enabling digits or codes to be input;
- a memory key 26; and
- programmable function keys 27, and the microphone 28.

A keyboard may also be provided for professional applications (for managing diary, directory, etc. functions).

Figure 3:
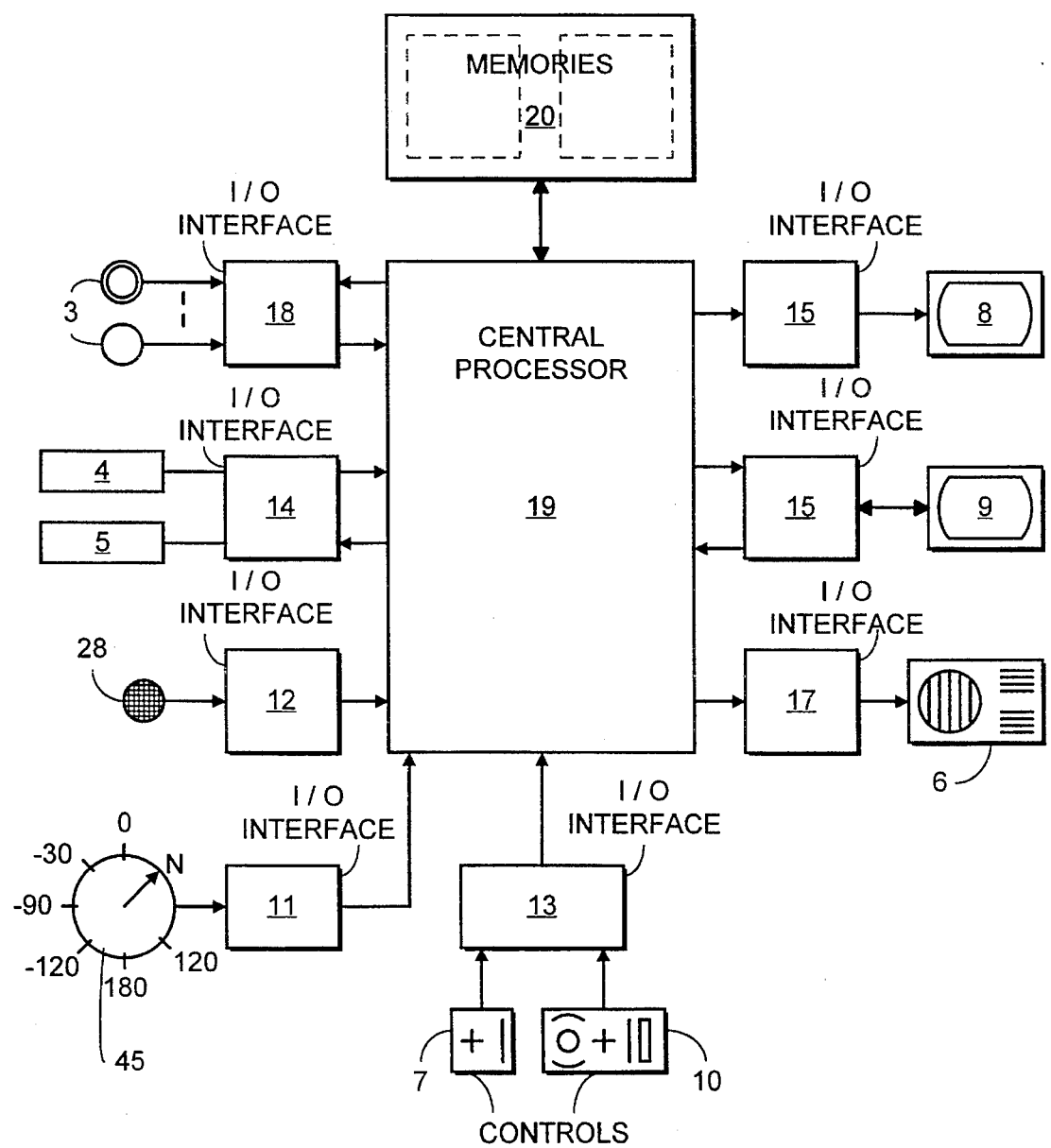
FIG. 3 shows the internal structure of a reader of the invention.

The internal structure of the device of the invention is described with reference to FIG. 3. This structure is organized around a central processor unit 19 and associated memories 20 (data memory and program memory) in a conventional microprocessor configuration. Special interfaces provide a connection with the various elements of the device: a measurement interface 28 for controlling a compass 45, two screen interfaces 15 for controlling the display screens 8 and 9, a keypad interface 13 for controlling the keypad and the set of controls 7, 8, a loudspeaker interface 17 for controlling the loudspeaker 6, a microphone interface 12 for controlling the microphone input 11, a reader interface 14 for controlling the digital or analog readers 4 and 5, and an input/output interface 18 for connection with the various external connectors and sockets 3.

The device is made self-contained by means of a self-contained electrical power supply (not shown) that may be constituted by a rechargeable battery advantageously provided with means for protecting its level of charge. To enable the device to be used in any location, a 12 V socket may also be provided for connection in a motor vehicle, as may a mains socket for connection at home or in the office.

All of the commands are available via the trackball (or the substitute therefor) by clicking on icons (menu bars, scroll arrows, position markers, etc. . . . ). Direct access to such icons may be obtained from the touch-sensitive screen 9 when available. The microphone 28 can be used for recording voice commands or sounds to be stored.

The memories 20 comprise in particular mass memory for storing digital multimedia or cartographic information (or analog information), programs, and information that is waiting to be printed out. These storage members may be of any kind (magnetic, optical, optomagnetic, etc. . . . ) and of any format (maps, floppy disks, hard disks, etc.).

The input/output connectors and sockets serve, in addition to the connections mentioned above, for providing connections with peripherals (a printer, a plotter, an external screen, a television set, a scanner, a digital camera, a video camera, etc. . . . ), with networks, with other computers, or indeed with other digital map readers.

The central processor unit 19 comprises, in particular, one or more processors (for calculation, optimization, topological simulation, compression, etc. . . . ), together with a time base enabling date and time to be displayed and enabling travel times to be computed. It cooperates with the compass 45 that makes it possible to measure the angle between the orientation of the appliance and magnetic north.

This structure makes it possible, using an appliance that is self-contained and portable, to perform a wide variety of map functions, including, for example: display; scrolling (to left, to right, etc.); zooming (change of scale); calculating routes (including calculating distances, times, changes of altitude, etc. analysis (displaying various themes: geological data or hydrological data, for example); printing out routes as calculated and including the main difficulties therein (cross-roads, forks, etc. . . . ); recording routes that have been followed and the times associated therewith; and recording texts, sounds, and images associated with a particular location. Similarly, special functions may be developed for use by certain categories of user: the professions, businesses, etc. (diary, directory, dictionary, memos, . . . ).

Figure 4:
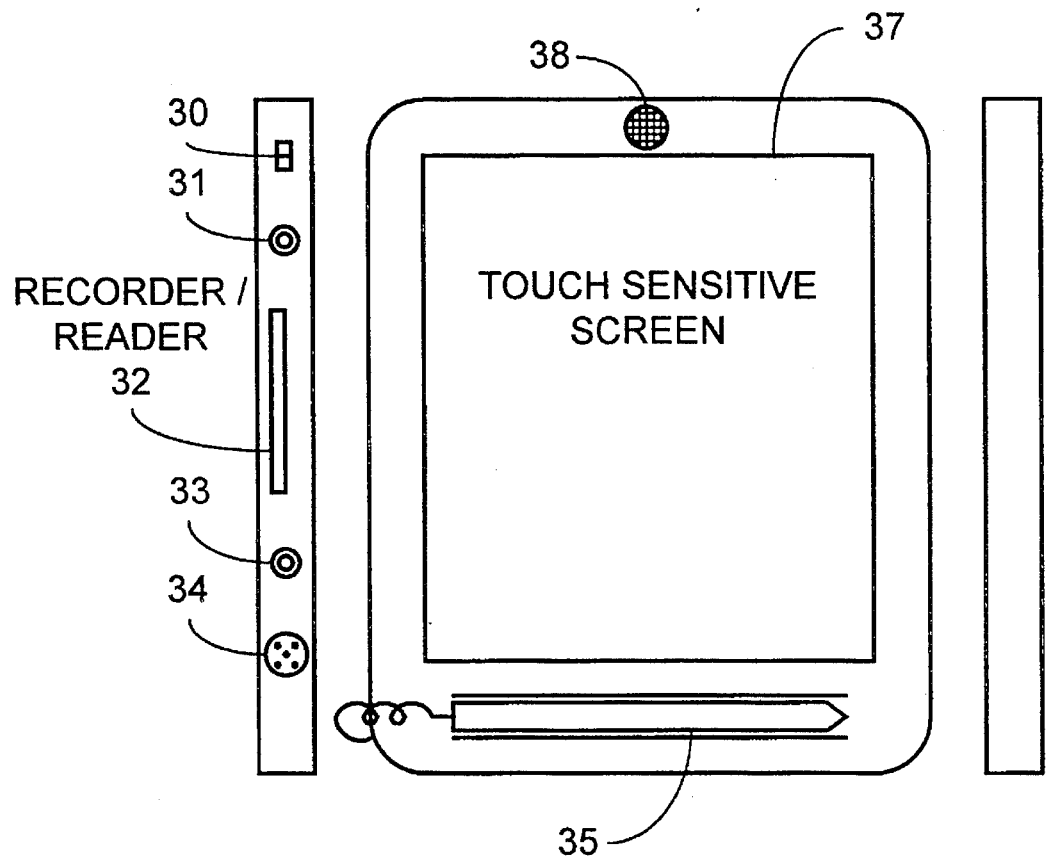
FIG. 4 shows a variant embodiment of a digital map reader that has only one screen.
Figure 5:
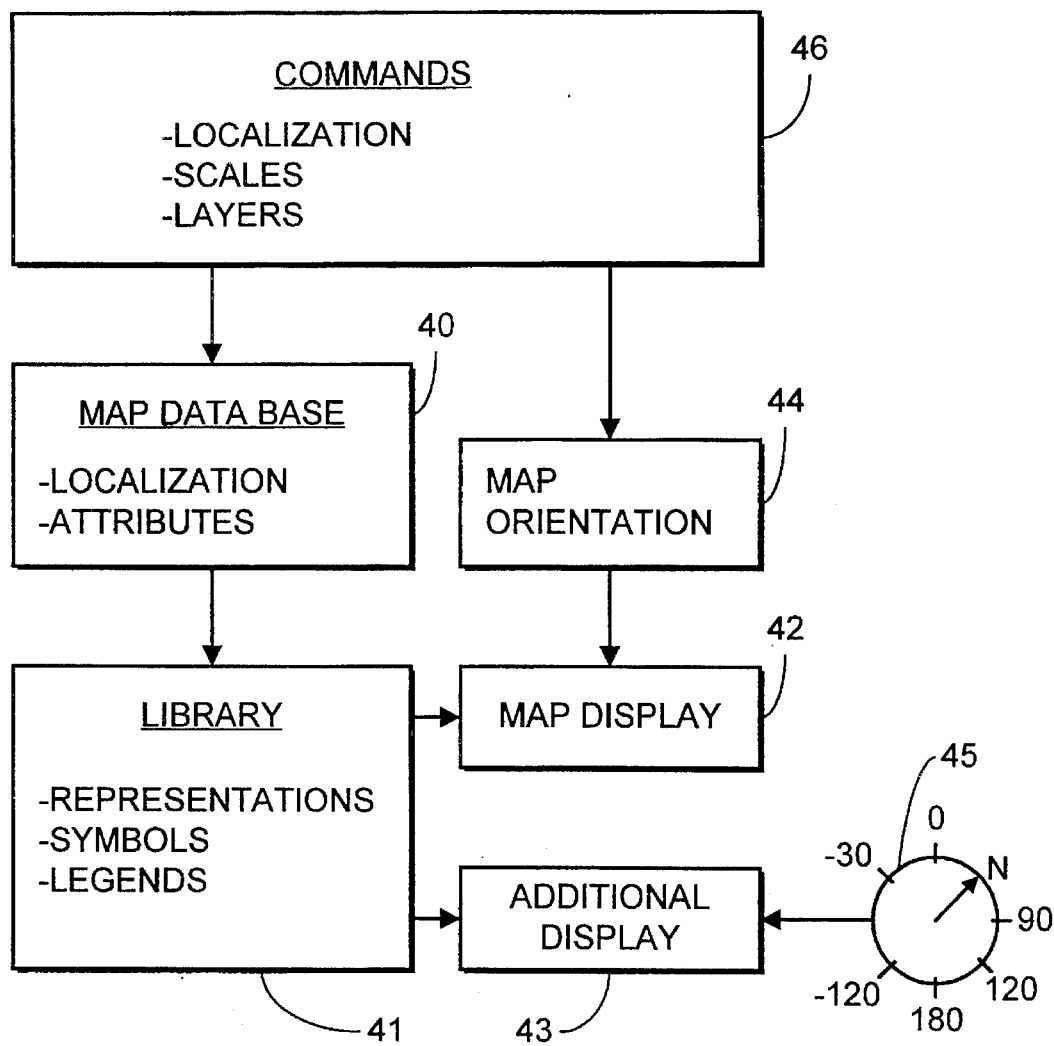
FIG. 5 is a simplified block diagram showing the functional organization of the device of the invention.

FIG. 4 shows an example of a single-screen embodiment. This device comprises an on/off switch 30, a 12 V input 31, a recorder-reader 32, a headset socket 33, an input/output connector 34, a light pen 35 for activating a touch-sensitive screen 37, and a microphone 38. In this embodiment, the various functions (guidebook, directory, diary, etc. . . . ) are displayed in windows that overlap a portion of the digital map that also appears on the same screen.

A conventional format for the device of the invention may be one of the formats A4 and A5, however any dimensions are possible providing the display is readable and the device is not too heavy for a device that is self-contained and portable.

Operation of the device of the invention is described below with reference to FIGS. 5 to 8.

The portable digital map reader displays cartographic information and additional information that may appear on one or more screens.

The basic functions of the device (displaying map, guidebooks, optimizing and tracking routes, diary, directory) may be associated with additional functions that are specific to professional or recreational activities.

The very large storage capacity of optical or magnetic systems makes it possible to store a very full amount of information: hotels, restaurants, bars, service stations and garages, police services; medical services, tourist information, or professional information of any kind, train and air timetables, FM frequencies, useful telephone numbers, etc. . . .

The above information is stored together with the cartographic database and can be very detailed in its description of the services available (opening days and times, menus, prices, times of guided tours, programs, etc. . . . ); the improvement over maps and guides on paper is overwhelming both with respect to the quantity of information and with respect to the ease and speed of access and of searching (particularly given the dynamic linking that can be achieved between the map and the guidebooks making it possible, for example, to answer the following question: list two-star hotels situated within 10 minutes' walking distance).

To make this possible, the database 40 comprising geographical objects (where an object may be a town, an area, a monument, etc. . . . ) is organized in such a manner as to enable firstly display at several scales (zoom) and secondly readability of the legends displayed on the map at any scale (once a single format has been adopted for legends), with this being true regardless of the angle at which the map is displayed. In addition, selecting and combining certain categories of objects are made easier by organization in layers, where any one object may be associated with a plurality of different layers.

One of the ways in which such a database can be organized consists in associating each geographical object with the following two elements:

location data for managing topology (position and shape of the object):
a centroid identified in a coordinate system;
points, segments, polygons, curves, etc. . . .

adjacency, continuity, inclusion, intersection, etc. . . . ; and attributes identifying and describing the object:
  name;
  type of object (with reference to a nomenclature);
  level numbers (an object may appear at several different levels);
  layer numbers (an object may belong to several different layers);
  characteristics (size, altitude, type, . . . ); and
  description and contents of the object.

For object description, attributes may be constituted by texts, still pictures, moving pictures, and/or sounds.

Each object is associated with a graphical representation that may additionally be associated with one or more symbols and with a legend, which set of elements is available in a library 41 that cooperates with the database 40.

The graphical representation depends on the type of the object, on its position, and where appropriate, on its shape and on its characteristics. Its size varies with scale (zoom) and it follows the orientation 44 as controlled by the compass 45.

The symbols and the legends are of fixed size and they are displayed horizontally to make them easier to read. Legends associated with segments of a network may be displayed parallel to such segments (see for example reference 54 in FIGS. 7 and 8).

Symbols are a function of the type of an object, and where appropriate of its characteristics and of the contents of its attributes (presence of a message, of illustrations, of animated sequences, of a sound sequence, . . . ). Legends display the name of the object using a typeface, a size, a color, and a style that depend on the type and on the characteristics of the object.

A display control 46 enables the objects that correspond to selected layers to be selected from the database 40 for one or more locations at one or more scales. The representations, symbols, and legends associated with the objects are then taken from the library 41 and displayed 42, 43 on the corresponding screens (or in the windows associated therewith for a single-screen embodiment). In addition, access to non-displayed information (detail attributes) is possible by moving a cursor onto the corresponding symbol or legend.

Figure 6:
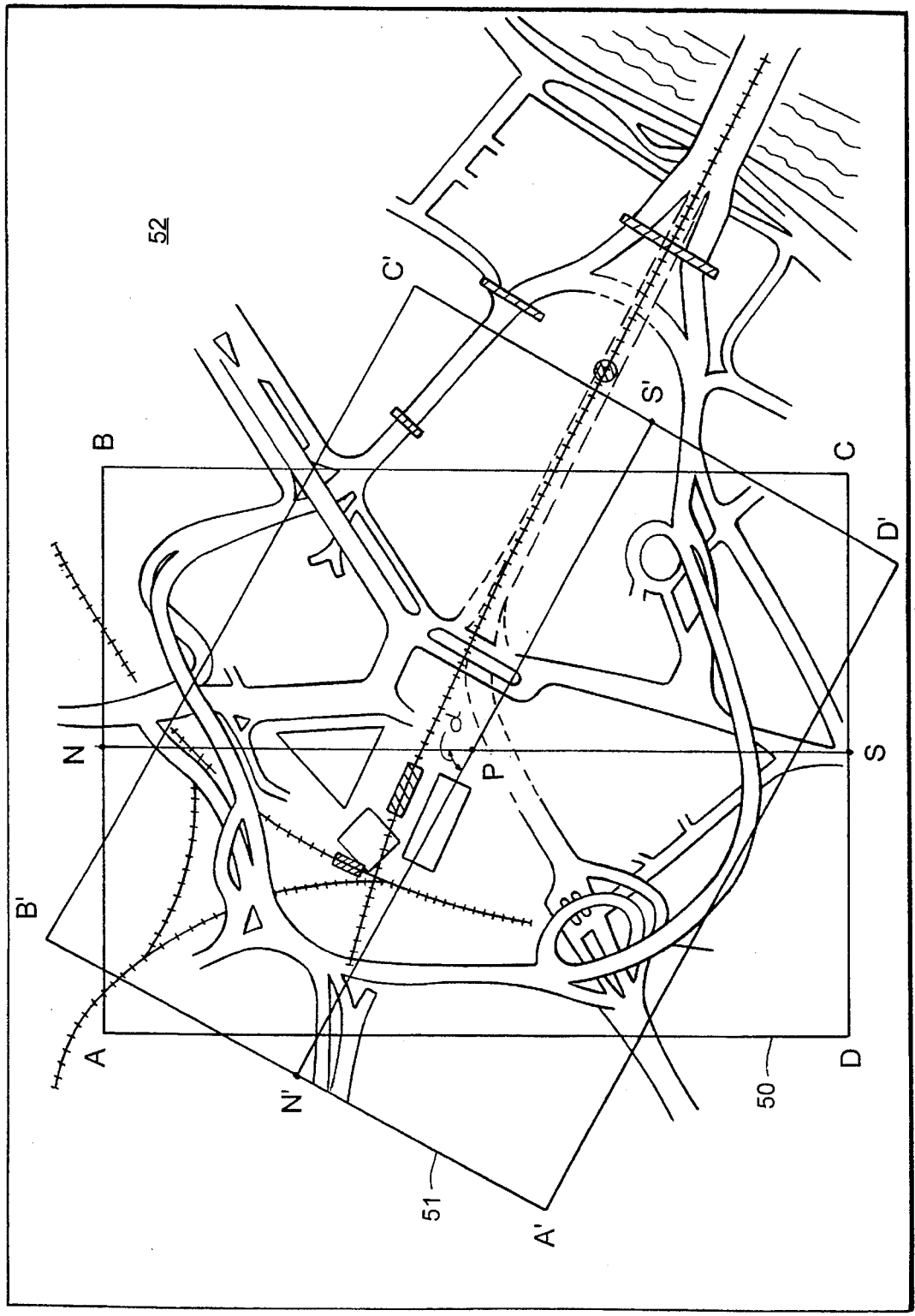
FIG. 6 shows at identical scale the effect of rotating the displayed map through an angle a due to the device itself being rotated.

FIG. 6 shows the influence of changing orientation of the device on the way in which cartographic data is displayed.

One of the objects of the present device is to make north as displayed on the map coincide with geographic north, regardless of the vertical direction of the display screen. Thus, the device includes a compass 45 as means for measuring the orientation of the portable appliance and for transmitting appropriate display instructions as a function thereof to enable the map to be displayed as a function of said orientation, i.e. to control the display axis of the map.

The compass measures the angle a between magnetic north and the vertical direction of the display screen (using a plus sign to the right and a minus sign to the left).

The geographical database contains values E for the difference between magnetic north and true north on the maps to be displayed. This value may be a constant for a country or a group of countries.

The angle of rotation of the map is then given by $$\alpha' = \alpha + E.$$

Consider the single-screen configuration with a display window 52 for a location P that is determined by its coordinates x,y in the window F specified by a height H and a width L and for a given scale, then objects are displayed that lie within the rectangle 50 (ABCD) using conventional display procedures.

The vertical axis NS shows north and south as they appear in the digital map.

If the angle $\alpha'$ is not equal to 0, then a new rectangle 51 (A',B',C',D') is calculated by performing rotation through an angle $\alpha'$ about the point P. The vertical N'S' of the new rectangle is no longer north/south but is the direction in which the appliance is then oriented. The rectangle 51 (A',B',C',D') is then displayed in the window F after being subjected to rotation in the opposite direction through an angle $\alpha'$ about the point P.

Figure 7:
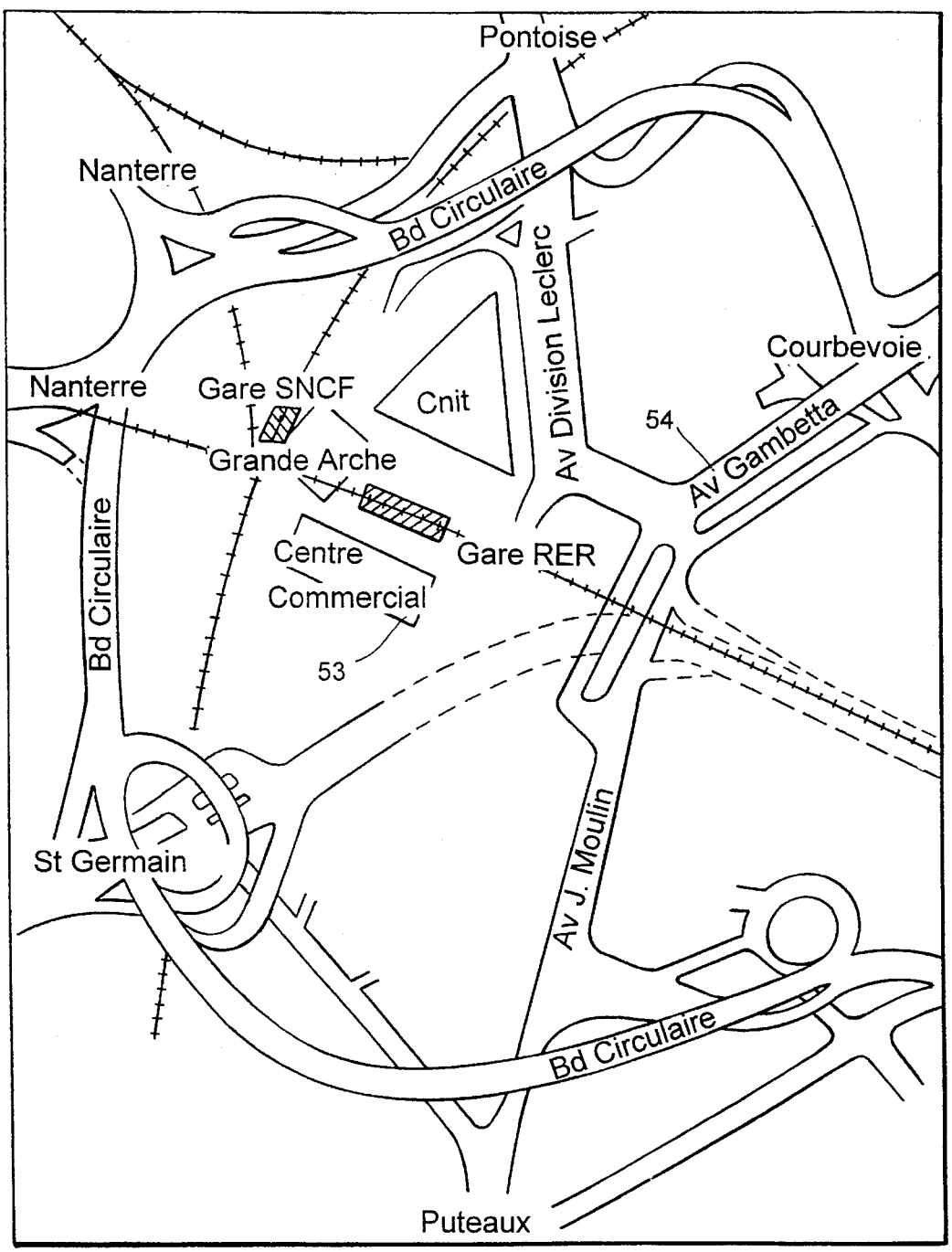
FIG. 7 is a first example of one of the displays possible on the display screen.
Figure 8:
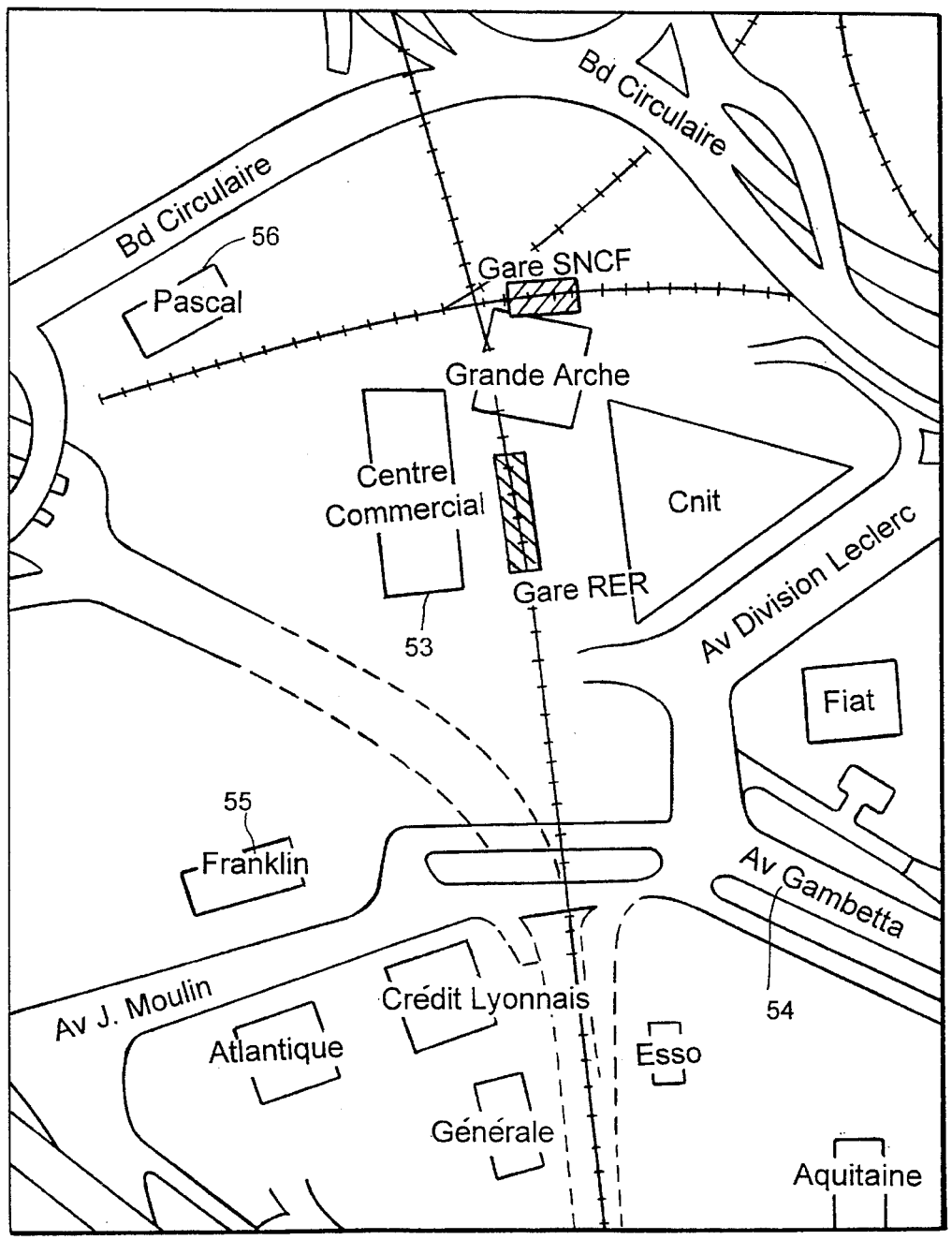
FIG. 8 shows a second example of a display after the device has been rotated and after a change of scale.

FIGS. 7 and 8 show two examples of cartographic data displays.

In FIG. 7, it can be seen that certain symbols 53 are displayed horizontally whereas other symbols 54 are displayed parallel to the road network that defines them.

In FIG. 8, which shows an enlarged portion of FIG. 7 after rotation through the angle $\alpha'$, it can be seen that the size of the legends has remained unchanged and that they continue to be displayed horizontally in spite of the map being rotated. Only data associated with a particular orientation (see reference 54) has been rotated through the angle $\alpha'$. It is also important to observe that the magnification (zoom) has caused new objects to appear, such as those referenced 55 or 56, with this facility being made possible by the fact that the cartographic information is organized in levels. For each object, a threshold level is defined at which that object appears, i.e. the scale from which it is to be displayed on the screen.

It has thus been observed that the device of the invention has multiple advantages: because it is self-contained it can be used equally well in the office, at home, in a vehicle, and in association with any kind of displacement (walking, cycling, sailing, horseriding, etc. . . . ); because of its power it provides access that is quick, easy, and interactive with data that is very fine and varied. It is particularly useful because of its "guidebook" function, since present guidebooks on paper are very poor due to reasons of bulk and are incapable of dynamically linking texts and maps. It can be personalized very easily, thus making it possible to have functions that are specific to certain companies, certain professions, certain recreational activities, and routes can be optimized in complex manner on the basis of parameters that account of choices and constraints applicable to each of those cases; finally, because of its high degree of functionality, it is particularly suitable for consumer applications (or even games such as treasure hunting) while nevertheless remaining suitable for professional use as can be reinforced by the optional presence of diary functions and of directory functions that facilitate preparation for a business trip (it has also been mentioned that it is possible to fit an external keyboard to the device).

It is of interest to observe that the power of the self-contained portable reader can be reinforced by adding a global positioning system (GPS) module to enable positioning to be determined, and by adding an altimeter for enabling altitude to be measured, with these two additional elements being particularly useful for travel in the wild, or in areas that are poorly sign-posted (rallying, for example).

I claim:

1. A portable appliance for displaying geographical data, in particular topographical or road maps, recorded on magnetic or optical media and organized on a plurality of levels, the appliance comprising a central processor unit associated with memories and I/O interfaces, said central processor unit selectively displaying objects constituting said geographical data in one of said plurality of levels depending on a desired display scale, means reading said magnetic or said optical media, at least one display screen for displaying said geographical data, and having a horizontal and a vertical axis, means for inputting control information to said central processor unit, and, electrical power supply means for powering said appliance, the appliance further including a compass for measuring the angle between the vertical axis of said display screen and magnetic north, and to send corresponding control information to said central unit based on said measured angle, said central unit responding to said corresponding control information by issuing a command to the display screen to cause the displayed image to be oriented as a function of said corresponding control information, wherein data symbols and legends are selectively imposed upon the associated displayed image in order to make said symbols and said legends readable.

2. An appliance according to claim 1, wherein said display screen comprises two display screens coupled to said central processor unit and being suitable respectively for displaying a portion of a digital map and any text information, a picture, and an icon.

3. An appliance according to claim 1, wherein said electrical power supply means is provided from at least one battery within said appliance.

4. An appliance according to claim 1, wherein said appliance can be taken on board a vehicle, with electrical power supply to the appliance being provided from a battery of the vehicle.

5. An appliance according to claim 1, further comprising means coupled to said central processor unit enabling location-specific multimedia information to be recorded and to be played back.

6. An appliance according to claim 1, further comprising means for recording and displaying geographical data associated with a route that has been previously planned or travelled, said geographical data associated with said route including time, distance, and changes in altitude.

7. An appliance according to claim 1, further including means for enabling other information to be recorded on said magnetic or optical media for display on the map, said other information including directory or diary information.

8. An appliance according to claim 1, wherein said display screen is touch-sensitive.

* * * * *